United States Patent [19]

Hall et al.

[11] Patent Number: 5,175,828

[45] Date of Patent: Dec. 29, 1992

[54] METHOD AND APPARATUS FOR DYNAMICALLY LINKING SUBPROGRAM TO MAIN PROGRAM USING TABLED PROCEDURE NAME COMPARISON

[75] Inventors: Michael L. Hall, Marysville; Glenn R. Engel, Lake Stevens, both of Wash.

[73] Assignee: Hewlett-Packard Company, Palo Alto, Calif.

[21] Appl. No.: 310,270

[22] Filed: Feb. 13, 1989

[51] Int. Cl.⁵ .............................................. G06F 9/42
[52] U.S. Cl. ................................. 395/375; 364/262.5; 364/255.7; 364/280.4; 364/262.9; 364/DIG. 1
[58] Field of Search ... 364/200 MS File, 900 MS File; 395/375

[56] References Cited

U.S. PATENT DOCUMENTS

| | | | |
|---|---|---|---|
| 3,909,797 | 9/1975 | Goss | 364/200 |
| 4,041,462 | 8/1977 | Davis | 364/200 |
| 4,217,638 | 8/1980 | Namimoto | 364/200 |
| 4,323,963 | 4/1982 | Wu | 364/200 |
| 4,355,355 | 10/1982 | Butwell | 364/200 |
| 4,408,274 | 10/1983 | Wheatley | 364/200 |
| 4,447,874 | 5/1984 | Bradley | 364/200 |
| 4,459,657 | 7/1984 | Murao | 364/200 |
| 4,500,952 | 2/1985 | Heller | 364/200 |
| 4,590,554 | 5/1986 | Glazer | 364/200 |
| 4,827,404 | 5/1989 | Barstow | 364/200 |
| 4,954,941 | 9/1990 | Redman | 364/200 |

OTHER PUBLICATIONS

Linkers and Loaders, L. Presser and White, J. R. University of Calif., Santa Barbara, Computing Surveys, vol. 4, No. 3, Sep. 1972.

Primary Examiner—Thomas C. Lee
Assistant Examiner—Eric Coleman

[57] ABSTRACT

A dynamic linker links a subprogram into an already complete program while the program is running. The linking is performed by initially creating a procedure in the subprogram with a name that matches a present procedure name within the program. The dynamic linker then compares the names to find the present procedure and replaces it with the subprogram procedure. The subprogram may contain one or more procedures that include additional functions. Procedure replacement techniques are described for RAM-and ROW-based systems. Unlike conventional linkers, the linking occurs while the program continues to run, preserving the program's data and state while changing or augmenting its functions.

7 Claims, 4 Drawing Sheets

FIG. 3 former code for present procedure selectMeas

```
_selectMeas
    link     a6,#LOCAL_FRAME
    movem.l  someRegs,(a7)
    pea      freqRegs
    jsr      _InstallSoftkey
    addq     #4,a7
    jsr      _fooBar
    jsr      _moreStuff
    movem.l  (a7),someRegs
    unlk     a6
    rts
    data
freqResp ascii "Frequency Response"
```
— 36 changed code for present procedure selectMeas

```
_selectMeas          _selectMeas (in Application)
    jmp      GARBAGE
             pea      freqRegs
             jsr      _InstallSoftkey
             addq     #4,a7
             jsr      _fooBar
             jsr      _moreStuff
             movem.l  (a7),someRegs
             unlk     a6
             rts
             data
freqResp ascii "Frequency Response"
```
— 38 code for new procedure selectMeas

```
_selectMeas          selectMeas (in Application)
    link     a6,#LOCAL_FRAME
    movem.l  someRegs,(a7)
    pea      xferFctn
    jsr      _InstallSoftkey
    addq     #4,a7
    jsr      _fooBar
    jsr      _moreStuff
    moem.l   (a7),someRegs
    unlk     a6
    rts
    data
xferFctn ascii "Transfer Function"
```
— 40

METHOD AND APPARATUS FOR DYNAMICALLY LINKING SUBPROGRAM TO MAIN PROGRAM USING TABLED PROCEDURE NAME COMPARISON

A portion of the disclosure of this patent document contains material which is subject to copyright protection. The copyright owner has no objection to the facsimile reproduction by anyone of the patent document or the patent disclosure, as it appears in the Patent and Trademark Office patent file or records but otherwise reserves all copyright rights whatsoever.

BACKGROUND OF THE INVENTION

This invention relates generally to methods and apparatus for linking computer subprograms together to form a composite program. More particularly, this invention relates to a method and apparatus for dynamically linking a new subprogram to a main program while the main program is running. A function of the main program may thus be changed or augmented by the new subprogram without loss of data or the state of the main program.

Many state-of-the-art instruments in the test and measurement field rely on software in part to carry out their functions. The main program controlling an instrument's operation and functions is normally stored in EPROM or ROM. In this manner the program is safely preserved and ready for use whenever the instrument is turned on.

Often, however, it becomes desirable to modify the main program after the instrument has left the manufacturer to add functions or to correct defects. Such changes have typically been made by the instrument manufacturer replacing the affected EPROMs or ROMs with updated versions. This process, as expected, can be laborious and expensive. The process does not allow the instrument owner or third party vendors to easily add applications to or otherwise customize the operation of the instrument. Providing that capability would enhance the versatility and the value of the instrument. Even if the main program is stored on a floppy disk, it is costly for the manufacturer to release a new version of the program.

One technique that is used to add capability to a program is the linking of separately compiled subprograms. The subprograms are stored on disk or other secondary storage, and a program known as a linker is run to link the subprograms together.

Linking, however, has not heretofore been a practical method for augmenting an existing, complete program such as referred to above. A complete program by its nature is not structured to call procedures in an additional subprogram. Furthermore, linking is a static process. That is, the subprograms making up the complete program are not complete and hence cannot be running at the time of linking. Both of these factors are drawbacks where it is of great inconvenience to shut down a computer system. For example, correcting bugs in a computer's operating system by linking in changes may require shutdown of the entire computer system.

An object of the invention, therefore, is to provide improved method and apparatus for augmenting or changing the capability of an existing program without having to replace it with another version.

Another object of the invention is to provide such a method and apparatus that can link new subprograms to an existing and complete program.

Yet another object of the invention is to provide such a method and apparatus that can modify a program while it is running so that data and the state of the program are not lost during modification.

Still another object of the invention is to provide such an apparatus in a form that can be easily used by the instrument owner or third party vendors.

SUMMARY OF THE INVENTION

In accordance with these objects, a dynamic linker is provided that links an additional subprogram into an already complete program while the program is running. Such subprograms are typically a collection of procedures or functions (which hereinafter are both referred to as procedures), depending upon the source language. Initially, the user provides a procedure within the additional subprogram with a name matching the name of a present procedure within the complete program. The subprogram is compiled to translate it into machine language as well as to generate a symbol table that associates an address with the name of each procedure within the subprogram. The dynamic linker loads the subprogram and compares the name of its procedures in the subprogram symbol table against the names of the procedures in the program symbol table to locate the name and address of the present procedure. After locating the present procedure, the linker replaces it with the new procedure. The subprogram is now linked to the program by, in effect, substituting its new procedure for the present procedure. Future invocations of the present procedure will instead invoke the new procedure and cause its functions to be executed.

The techniques employed by the dynamic linker for replacing the present procedure can vary, depending on where the program is resident. In the case of a RAM-based system, the program is loaded into main memory. The dynamic linker may modify the present procedure to cause it to transfer control to the new procedure whenever the present procedure is invoked. Changing the first instruction of the present procedure to a jump instruction, for example, will cause a jump to the new procedure. In a ROM-based system, the program cannot be changed because it resides in memory that cannot be written to. Instead, a jump table is utilized as the entry point to the present procedure in ROM. When it is desirable to replace the present procedure in the program, the dynamic linker modifies the jump table to point to the new subprogram instead.

The foregoing and other objects, features, and advantages of the invention will become more apparent from the following detailed description of a preferred embodiment which proceeds with reference to the accompanying drawings.

BRIEF DESCRIPTION OF THE DRAWINGS

FIG. 3 illustrates the changes in code made by the dynamic linker in a RAM-based system to replace a present procedure with the new procedure contained in the subprogram.

DETAILED DESCRIPTION

The linking of subprograms into a composite program is well understood in the art. A program for carrying out this function is known as a linker and is often provided as a utility to a computer's operating system. How a conventional linker works is covered in depth in numerous works such as the article by Presser et al. in "Linker and Loaders," *Computing Surveys*, Vol. 4, No. 3 (September, 1972), which is hereby incorporated by reference. For purposes of the present invention, it should be understood that a linker typically combines subprograms that are in binary symbolic form (referred to as object modules or object files) into an output module. These subprograms, which comprise a collection of one or more procedures, can come from secondary storage or directly from translation by a translator such as a compiler or assembler. In addition to translating the source code into binary code, the translator produces a relocation table and a symbol table. The symbol table associates the name of each identifier, such as a procedure's name, in the subprogram with the address of a memory location. Translators and their output are also well known in the computing arts and are described at length by Aho et al. in *Compilers, Principles, Techniques and Tools* (1986), which is also incorporated by reference. The symbol table in turn includes both locally defined and externally referenced identifiers (also referred to as symbols) that are defined in other subprograms. In linking independently translated subprograms into a single output module, the linker resolves the externally referenced identifiers so that each identifier in the output module is defined. Without such resolution, the object module is not sufficiently complete to run properly. For this reason, conventional linkers work with disk-based subprograms that are independently compiled but are not executing, combining them into a composite, complete program before execution is attempted.

The present invention, by contrast, is a dynamic linker. Rather than linking a number of disk-based subprograms, the dynamic linker links a subprogram to a presently complete "main" program. Moreover, the linker can perform this linking while the complete program is running. This feature enables the main program to preserve its data and state while being linked to an additional subprogram that changes or augments the main program's functions. In other aspects, the dynamic linker operates much like a conventional linker. Where appropriate, reference will be made to the conventional operation to simplify the description of the invention.

Figure 1:
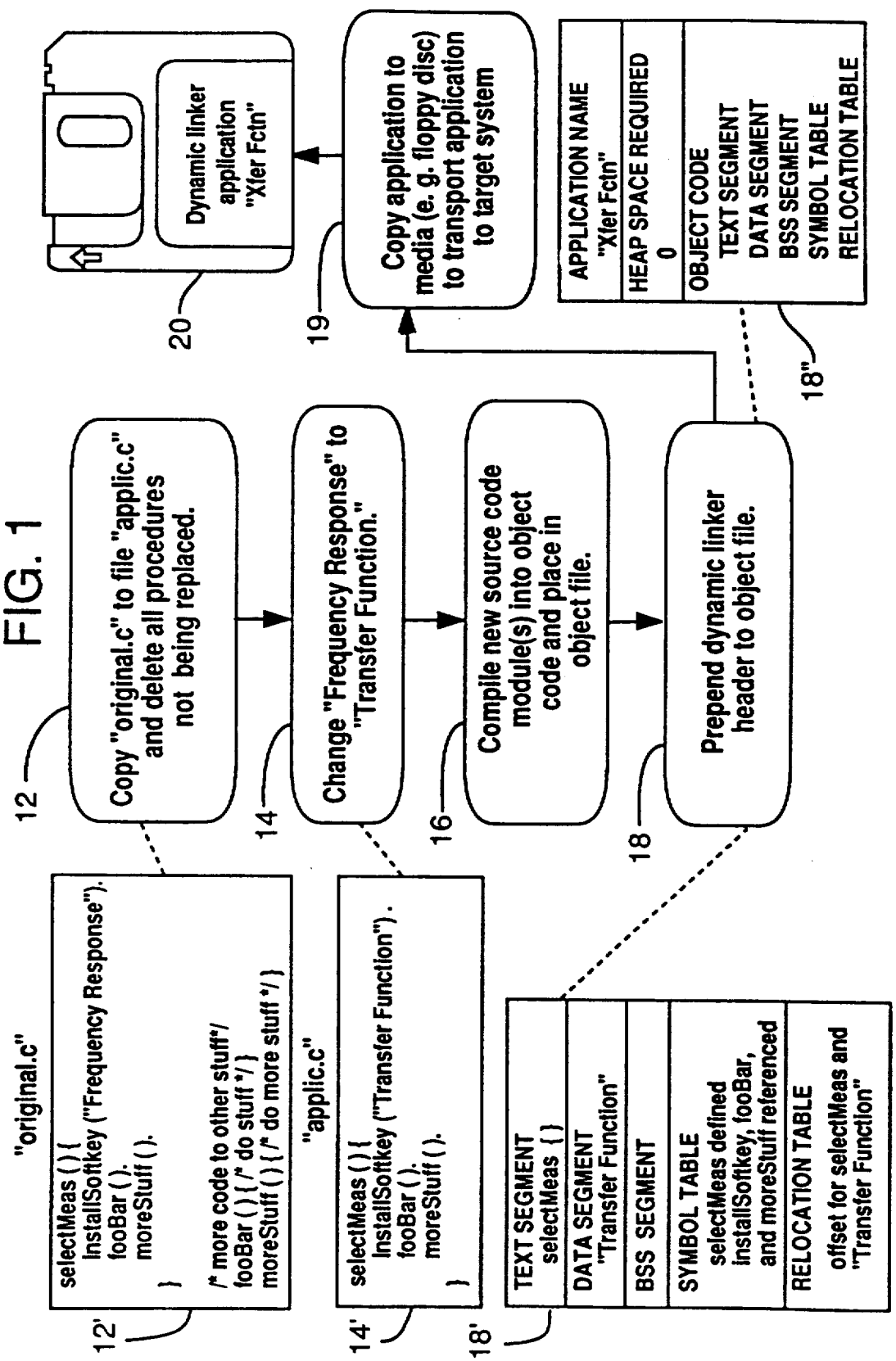
FIG. 1 is a flow diagram of the steps taken to prepare a subprogram containing a new procedure for linking to a main program within an instrument.

Referring now to FIG. 1, the flow diagram illustrates the preparation of a new subprogram for eventual linking to a main program of an instrument via the dynamic linker. Each step in the diagram bears a reference numeral which is noted in parentheses herein as the step is described. It is assumed in FIG. 1 that the new subprogram is prepared on a separate host computer for copying to a medium and then transported to the target system such as an instrument containing the main program. Where the host computer and the target system are within the same computing environment, such copying to an intermediate medium is unnecessary.

The new subprogram shown in FIG. 1 will be linked to the main program for changing the displayed menu label associated with an instrument key from "Frequency Response" to the equivalent "Transfer Function." Assume that the term "Frequency Response" is presently displayed by the instrument's main program on the instrument's display screen when the main program is running and the menu is active.

The new subprogram is created by initially copying an original source code subprogram (also referred to as a module) of the main program that contains the procedure to be replaced. In this example, the subprogram "original.c" contains the present procedure and the subprogram is copied to a new file "applic.c" (12). Box 12' represents the contents of the original subprogram, including the procedure selectMeas. The source code of the subprograms comprising the main program, including the subprogram for the dynamic linker, are written in the C programming language in the present embodiment. They could, however, as well be written in any source language of comparable capability.

All subprogram procedures other than the procedure selectMeas for generating "Frequency Response" are then deleted from the new file "applic.c". With a text editor, the label within selectMeas is changed from "Frequency Response" to "Transfer Function" (14). The change in the code is illustrated in box 14'. The new source code is then compiled into object code (16) and becomes an object file. The file format is conventional such as described in the HP-UX Reference Manual (1986), which is hereby incorporated by reference.

If procedures in a number of subprograms are to be modified instead of just the one illustrated, there would be multiple new source files created. In such a case, the new files would each be separately compiled and then linked together with a conventional static linker into a new subprogram. Static linking of such object files is also described in the above manual.

The compiler output at this point is an object file shown in box 18' and includes text, data, and bss segments as well as the symbol table and the relocation table. The symbol table includes a definition for selectMeas but only external references for the included procedures installSoftkey, fooBar, and moreStuff. Definitions for these procedure identifiers reside in the main program. The relocation table provides the offsets from the base address of the subprogram for relocating the object code of the application file into main memory. The offsets are converted to absolute addresses at the time the dynamic linker links the subprogram to the main program.

To convert the object file of box 18' into an application file, a header is prepended to the file (18). The application file that results is shown in box 18". The header identifies the application by a name such as "XferFctn" and indicates the amount of free memory (also referred to as heap space) required in main memory for running the application. (The application in this example requires no free memory beyond that allocated to store it since it is merely a character string replacement.) The name of the application is read by the dynamic linker to determine if the application has already been loaded. This may occur where, for example, the application file is loaded individually and then again as part of a batch of application files. The check against the application name preserves memory space by preventing the same file from twice being loaded and stored in memory. If not enough memory is available for loading the application, the linker will not load it and will indicate the non-loading to the user.

As a final step in preparation of the new subprogram, the application file is copied to a medium such as a floppy disk 20 for transport to the instrument whose main program is to be modified (19). This is the likely scenario in most cases. A third party vendor or the manufacturer may have developed new applications for the instrument, where the main program is in ROM.

Figure 2:
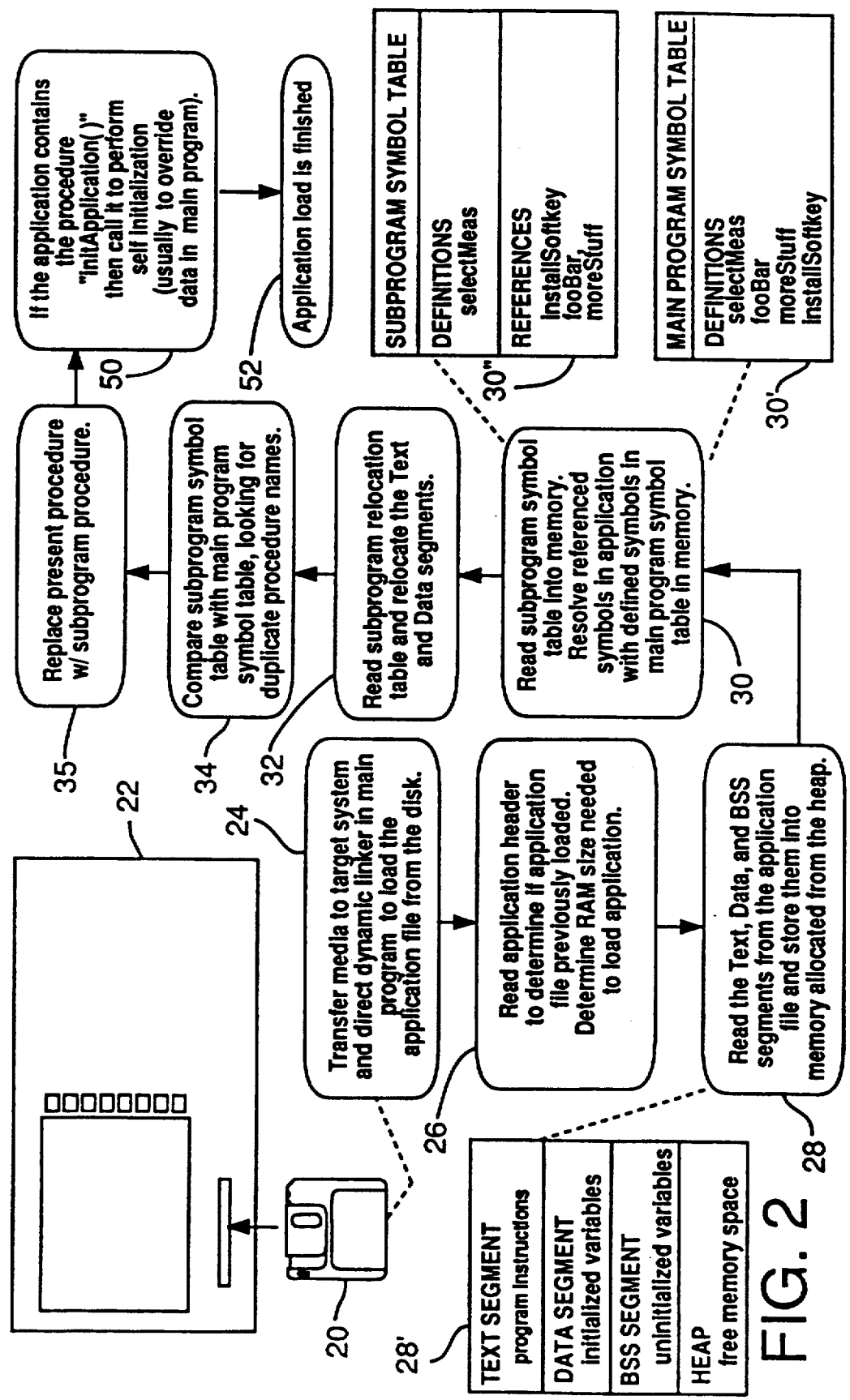
FIG. 2 is a flow diagram of the steps taken by the dynamic linker to link the newly prepared subprogram to the main program.

FIG. 2 illustrates how the dynamic linker links the newly prepared subprogram (which is now the application file) to the main program. The disk 20 is inserted into a disk drive of the instrument 22. The dynamic linker which resides in the instrument software is then directed through menu commands to load the application file from the disk 20 into the main memory of the instrument (24). The linker first reads the application header to determine if the application file has already been loaded (26). It then determines if sufficient free memory exists for loading the file. If so, the linker reads the text, data, and bss segments of the application file and then stores them in free memory (28) as indicated in box 28'. The source code for loading and screening the application is shown in Listing I of the Appendix. All this occurs while the main program, which is unaffected, continues running.

The linker then reads the subprogram symbol table into memory (30). As in conventional linkers, referenced identifiers (symbols) in the application file are resolved with defined identifiers in the main program symbol table shown in boxes 30' and 30", respectively. In the present example, installSoftkey, fooBar, and moreStuff are defined in the main program symbol table 30". With the identifiers resolved, the linker proceeds in conventional fashion to read the subprogram relocation table to relocate the text and data segments in main memory (32).

At this point in the linking process, the subprogram (application file) is not yet completely linked to the main program. Nothing in the main program will cause it to call the application file. It should be recalled that the main program is complete beforehand and that all identifiers within that are already defined and need not be resolved. To complete the link the dynamic linker replaces a present procedure within the main program with the new procedure within the subprogram. It begins by comparing the subprogram symbol table with the main program symbol table to determine if duplicate procedure names exist (34). In the present example, the procedure of interest is the procedure selectMeas. This procedure is determined to be a duplicate. The source code for determining if a duplicate procedure name exists and for the linker to locate the duplicate procedure is listed in Listing II of the Appendix.

The linker then locates and replaces (35) the present procedure selectMeas with the new procedure using techniques, to be described, that depend on where the main program resides. Calls to the present procedure call the new procedure instead. Since the address of all callers to the present procedure is not known to the linker, it is the present procedure that is modified.

FIG. 3 illustrates one such technique where the main program is resident in RAM, loaded there from a floppy disk into the instrument or computer main memory. In a RAM-based system, the code comprising the present procedure can be directly modified to cause a jump to the new procedure. The code for the present procedure selectMeas is shown in box 36. To replace it with a new procedure within the linked subprogram, the dynamic linker modifies the first instruction (and part of the second) to contain a jump instruction "jmp selectMeas (in Application)" to the new procedure as shown in box 38. When the present procedure is now called as the main program executes, the new procedure shown in box 40 is invoked instead. Consequently "Transfer Function" is displayed in place of "Frequency Response." Part of the present procedure is obliterated, but it will not be used again while the main program is running. The main program is otherwise unaffected. The source code for so modifying a procedure appears in Listing III of the Appendix.

Figure 4:
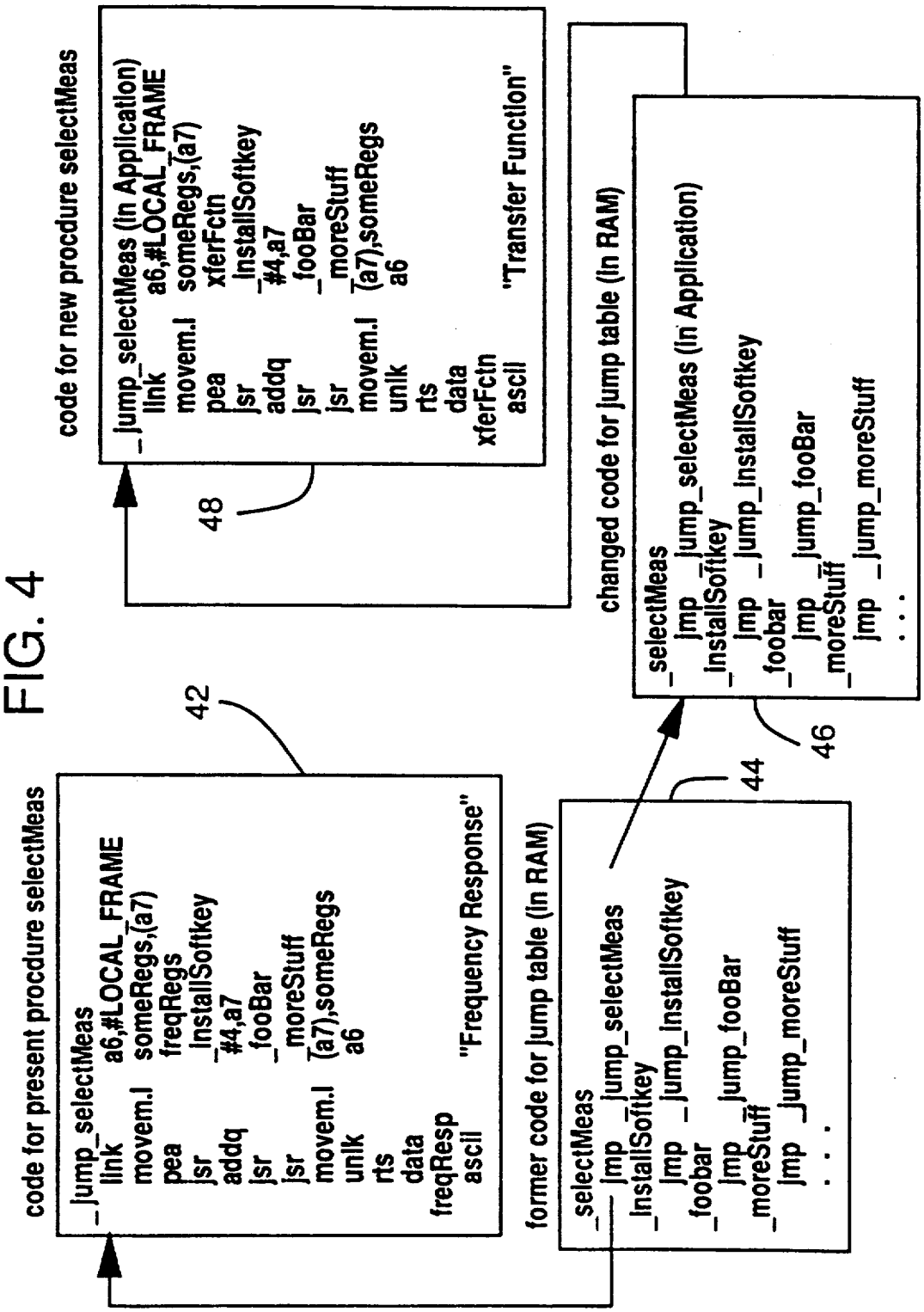
FIG. 4 illustrates the changes in code made by the dynamic linker in a ROM-based system to replace a present procedure with the new procedure contained in the subprogram.

In ROM-based systems, the main program is stored in ROM and its code cannot be modified so directly. In such cases, the original code for the main program is modified before it is compiled to add intermediate entry points to procedures in ROM that might be changed. The intermediate entry points are collected in a jump table, a technique known in the art, that contain jump instructions to the ROM-based procedures of interest. The jump table is part of the main program in ROM and is copied at run time from ROM into RAM. In RAM, the jump table can be modified to cause a jump to a new procedure. FIG. 4 illustrates this technique. Box 42 shows the code of the present procedure selectMeas now in ROM that is to be replaced. Box 44 shows the present jump table that causes a jump to the ROM location of selectMeas whenever it is called. To replace the present procedure with the new procedure, the dynamic linker changes the jump instruction to cause a jump to "_jump_selectMeas (in application)," an address in RAM, as shown in box 46. This change in the entry point directs calls to the new procedure, shown in box 48. "Frequency Response" is now replaced with "Transfer Function." The source code for effecting the change in the jump table appears in Listing IV of the Appendix.

Returning now to FIG. 2, procedure replacement using one of the two techniques just described takes the linker to an optional next step (50) before the application load is finished (52). Where it is desirable to modify data segments instead of program instructions, the further step (50) may be used in the alternative or in addition. Within the new subprogram a user may add a start-up procedure called "initApplication()." This procedure, if it exists, is called at the end of the dynamic linking operation. Since an application can access all non-local data structures of the main program, it can affect the main program by simply changing its data. In the present example, "initApplication()" could have been called instead of replacing selectMeas because only data is affected in replacing "Frequency Response" with "Transfer Function." This assumes the data is defined as a variable so that it may be readily located.

At this point, the application load is finished (52) and the application (the new procedure) ready to be called when a reference to the replaced procedure is made in the main program. Such a reference could be prompted by pressing a key on the instrument panel to select the new function.

It should be understood that the method is not limited to merely replacing one line of code for another or one operation for another. The new subprogram may contain any number of new procedures that overlay present procedures and augment the functions of the present procedures. The new subprogram is limited only by the size of the available main memory.

Having illustrated and described the principles of the invention in a preferred embodiment, it should be apparent to those skilled in the art that the invention can be modified in arrangement and detail without departing from such principles. We claim all modifications coming within the spirit and scope of the following claims.

APPENDIX

Listing I

```c
include <stdio.h> define APPLNAME_SIZE 12 typedef struct {
        char applName[APPLNAME_SIZE];
        long minMemory;
} INFO_HDR, *INFO_PTR;

typedef struct {
        long    a_magic;
        short   a_stamp;
        short   a_unused;
        long    a_spare;
        long    a_text;             /* size of text segment */
        long    a_data;             /* size of data segment */
        long    a_bss;              /* size of bss segment */
        long    a_trsize;           /* text relocation size */
        long    a_drsize;           /* data relocation size */
        long    a_spare1;
        long    a_lesyms;           /* symbol table size */
        long    a_spare2;
        long    a_spare3;
        long    a_spare4;
        long    a_spare5;
        long    a_spare6;
        long    a_spare7;
} EXEC_HDR, *EXEC_PTR;

/*
   packed symbol table entries as they are in object file,
   symbol name follows the symbol table entry
*/
typedef struct {
        long n_value;
        unsigned char n_type;
        unsigned char n_length;     /* length of ascii symbol name */
        short n_almod;
        short n_unused;
} F_NLIST, F_NLIST_PTR;

/*
   unpacked symbol table entries as they are in memory,
   symbol name pointed to by n_name.
*/
typedef struct {
        char *n_name;
        long n_value;
        unsigned char n_type;
        unsigned char n_length;     /* length of ascii symbol name */
} NLIST, *NLIST_PTR;
```

```
typedef struct appl_hdr {
        struct appl_hdr *prevAppl;
        INFO_HDR infoHdr;
        EXEC_HDR execHdr;
        char *progPtr;
        NLIST_PTR symPtr;
        long symCnt;
} APPL_HDR, *APPL_PTR;

/*
  load application with the file name of "fileName."  The parmameter
  "mainProgram" describes a linked list of all currently loaded
  applications. */
APPL_PTR loadAppl (fileName, mainProgram)
APPL_PTR *mainProgram;
char *fileName;
{
        FILE *anAppl;
        APPL_PTR newAppl = (APPL_PTR) 0;
        long progSize;
        char *extraPtr = (char *) 0;
        EXEC_PTR execPtr;
        INFO_PTR infoPtr;

/* open file */
        anAppl = fopen (fileName, "r");
        if (anAppl == (FILE *) 0) {
                error ("Cannot Open Application file");
                goto errExit;
        }

/* allocate application information structure */
        newAppl = (APPL_PTR) malloc (sizeof (APPL_HDR) );
        if (newAppl == (APPL_PTR) 0) {
                error ("Not Enough Memory Available For Application");
                goto errExit;
        } newAppl->progPtr = (char *) 0;
        newAppl->symPtr = (NLIST_PTR) 0;
        execPtr = &newAppl->execHdr;
        infoPtr = &newAppl->infoHdr;

/* read application header */
        if (fread (infoPtr, sizeof (INFO_HDR), 1, anAppl) != 1)
                goto badAppl;

/* see if application already loaded */
        if (applIsLoaded (infoPtr->applName, *mainProgram) ) {
                error ("Application is already Loaded");
                goto errExit;
        }

/* read execution module header */
        if (fread (execPtr, sizeof (EXEC_HDR), 1, anAppl) != 1)
                goto badAppl;

/* allocate memory for text, data, bss segments and symbol
            table */
```

```
progSize = execPtr->a_text + execPtr->a_data + execPtr->a_bss;
newAppl->progPtr = (char *) malloc (progSize);
newAppl->symPtr = (NLIST_PTR) malloc (execPtr->a_lesyms);
extraPtr = (char *) malloc (infoPtr->minMemory);

/* check to see if enough memory */
if (newAppl->progPtr == (char *) 0 ||
    newAppl->symPtr == (NLIST_PTR) 0 || extraPtr == (char *) 0) {
        error ("Not Enough Memory Available For Application");
        goto errExit;
}

/* read text & data segments */
if (fread (newAppl->progPtr, execPtr->a_text + execPtr->a_data, 1,
        anAppl) != 1)
        goto badAppl;

/* initialize BSS segment */
memset (newAppl->progPtr + execPtr->a_text + execPtr->a_data, '\0',
        execPtr->a_bss);

/* read symbol table */
if (fread (newAppl->symPtr, execPtr->a_lesyms, 1, anAppl) != 1)
        goto badAppl;

/* unpack symbol names from symbol table */
if ( ! unpackSymbols (newAppl) )
        goto errExit;

/* resolve symbols in symbol table with main program */
if ( ! resolveSymbols (newAppl, *mainProgram) ) {
        error ("Unresolved Symbols In Application");
        goto errExit;
}

/* relocate symbols in symbol table */
if ( ! relocateSymbols (newAppl) ) {
        error ("Bad Relocation Table In Application");
        goto errExit;
}

/* read text and data relocation tables and relocate the code */
if ( ! readRelocation (newAppl) )
        goto badAppl;

/* free minimum memory pointer, only needed to test mem
   available */
free (extraPtr);

/* link new application with all old applications and main
   program */
newAppl->prevAppl = *mainProgram;
*mainProgram = newAppl;
return newAppl;

badAppl:
        error ("File is Not a Valid Application");
errExit:

if (newAppl) {
                if (newAppl->progPtr)
                        free (newAppl->progPtr);
                if (newAppl->symPtr)
                        free (newAppl->symPtr);
                free (newAppl);
```

```
        }
        if (extraPtr)
                free (extraPtr);
        if (anAppl)
                fclose (anAppl);
        return (APPL_PTR) 0;
} unpackSymbols (newAppl)
APPL_PTR newAppl;
{
        long symSize = newAppl->execHdr.a_lesyms;
        long symCnt = 0;
        NLIST_PTR newSym;
        char *oldSym = (char *) newAppl->symPtr;
        char *oldSymEnd = oldSym + symSize;
        F_NLIST aSym;
        char *symName;

/* allocate space for unpacked symbol table */
        newSym = (NLIST_PTR) malloc (symSize);
        if (newSym = (NLIST_PTR) 0) {
                error ("Not Enough Memory Available For Application");
                return 0;
        }

/*
           unpack symbols, put symbol entries at start of symbol area,
           and symbol names at end of symbol area.
        */
        symName = (char *) newSym + symSize;

while (oldSym < oldSymEnd) {
                memcpy (&aSym, oldSym, sizeof (F_NLIST) );
                oldSym += sizeof (F_NLIST);
                newSym->n_value = aSym.n_value;
                newSym->n_type = aSym.n_type;
                newSym->n_length = aSym.n_length;
                symName -= aSym.n_length;
                newSym->n_name = symName;
                strncpy (symName, oldSym, aSym.n_length);
                symCnt++;
                oldSym += aSym.n_length;
        } free (newAppl->symPtr);
        newAppl->symPtr = newSym;
        newAppl->symCnt = symCnt;
        return 1;
} applIsLoaded (applName, applList)
char *applName;
APPL_PTR applList;
{
        while (applList) {
                if (strcmp (applName, applList->infoHdr.applName) == 0)
                        return 1;   /* application is already loaded */
                applList = applList->prevAppl;
        } return 0;   /* application is not loaded */
}
```

Listing II

```c
define APPLNAME_SIZE 12 typedef struct {
        char applName[APPLNAME_SIZE];
        long minMemory;
} INFO_HDR, *INFO_PTR;

typedef struct {
        long    a_magic;
        short   a_stamp;
        short   a_unused;
        long    a_spare;
        long    a_text;                 /* size of text segment */
        long    a_data;                 /* size of data segment */
        long    a_bss;                  /* size of bss segment */
        long    a_trsize;               /* text relocation size */
        long    a_drsize;               /* data relocation size */
        long    a_spare1;
        long    a_lesyms;               /* symbol table size */
        long    a_spare2;
        long    a_spare3;
        long    a_spare4;
        long    a_spare5;
        long    a_spare6;
        long    a_spare7;
} EXEC_HDR, *EXEC_PTR;

/*
   unpacked symbol table entries as they are in memory,
   symbol name pointed to by n_name.
*/
typedef struct {
        char *n_name;
        long n_value;
        unsigned char n_type;
        unsigned char n_length;         /* length of ascii symbol name */
} NLIST, *NLIST_PTR;

/* symbol types in file n_type of structure NLIST */
#define EXTERN  040     /* = 0x20 */
#define UNDEF   00
#define ABS     01
#define TEXT    02
#define DATA    03
define BSS     04 typedef struct appl_hdr {
        struct appl_hdr *prevAppl;
        INFO_HDR infoHdr;
        EXEC_HDR execHdr;
        char *progPtr;
        NLIST_PTR symPtr;
        long symCnt;
} APPL_HDR, *APPL_PTR;

/*
   Search for a duplicate procedure name (procName, nameLength) in the
   symbol tables in the application list passed (applList);
   The name passed is not null terminated.
```

This procedure checks to see that the symbol matched is in the
TEXT segment (assumes RAM based system). For a ROM based system,
you need to check that the symbol is in the DATA segment and the
instruction at that location is a jump to a instruction in the TEXT
segment.
   Return pointer to symbol table entry if name found, else return 0.
*/
NLIST_PTR findProc (name, nameLength, applList)
char *name;
unsigned char nameLength;
APPL_PTR applList;
{
        NLIST_PTR symPtr;
        long symCnt;

while (applList) {
                symPtr = applList->symPtr;
                symCnt = applList->symCnt;

while (--symCnt >= 0)
                        if (symPtr->n_type == (EXTERN | TEXT) &&
                            nameLength == symPtr->n_length &&
                            strncmp (symPtr->n_name, name) == 0)
                                return symPtr;
                        else
                                symPtr++;

applList = applList->prevAppl;
        } return (NLIST_PTR) 0;
}
```

Listing III

```
/*
  unpacked symbol table entries as they are in memory,
  symbol name pointed to by n_name.
*/
typedef struct {
        char *n_name;
        long n_value;
        unsigned char n_type;
        unsigned char n_length;      /* length of ascii symbol name */
} NLIST, *NLIST_PTR;

define JUMP_INSTRUCTION 0x4ef9

/*
  Replace the procedure represented by the oldSym symbol table entry
    with the newSym symbol table entry. This assumes a RAM based system.
*/
replaceRamSymbol (oldSym, newSym)
NLIST_PTR oldSym, newSym;
{
        char *p = (char *) oldSym->n_value;

* (int *) p = JUMP_INSTRUCTION;
        p += sizeof (int);

* (long *) p = newSym->n_value;
}
```

Listing IV

```
/*
    unpacked symbol table entries as they are in memory,
    symbol name pointed to by n_name.
*/
typedef struct (
        char *n_name;
        long n_value;
        unsigned char n_type;
        unsigned char n_length;        /* length of ascii symbol name */
) NLIST, *NLIST_PTR;
/*
    Replace the procedure represented by the oldSym symbol table entry
    with the newSym symbol table entry.  This assumes a ROM based system.
    Both symbols point to a jump table entry (start of a jump instruction).
    All that is needed to do is replace the address of the jump in the
    old procedure to point to the new jump table entry.
*/
replaceRomSymbol (oldSym, newSym)
NLIST_PTR oldSym, newSym;
(
        char *p = (char *) oldSym->n_value;
        /* skip jump instruction */
        p += sizeof (int);
        * (long *) p = newSym->n_value;
)
```

We claim:

1. A computer implemented method of dynamically linking a subprogram that includes a replacement procedure to a main program while the main program is running, comprising the computer implemented steps of:
    comparing within the computer the procedure name in a subprogram symbol table with main program procedure names in a main program symbol table to locate a main program procedure that matches the subprogram name; and
    changing an instruction in the main program to cause the named main program procedure having the matching name to a jump instruction to cause a jump to the subprogram procedure whenever the main program procedure is called.

2. Apparatus for dynamically linking in a computer a subprogram to a main program while the main program is running, comprising:
    means for comparing procedure names in a subprogram symbol table with procedure names in a main program symbol table to determine if a duplicate name appears in both tables; and
    modifying means responsive to a determination of duplicative names for changing an instruction in the main program procedure having the duplicate name to a jump instruction to cause a jump to the subprogram procedure whenever the main program procedure is called.

3. The apparatus of claim 2 wherein the modifying means comprises:
    an entry point to the main program procedure in a writable memory location that contains the address of the main program procedure; and
    means for writing the address of the subprogram procedure into the memory location over the address of the present procedure.

4. A method of dynamically linking a subprogram to a currently executing main program, comprising:
    providing a subprogram procedure with a name matching the name of a main program procedure;
    translating the subprogram procedure to place the name of the subprogram procedure in a subprogram symbol table;
    comparing the subprogram procedure name in the subprogram symbol table with main program procedure names in a main program symbol table for locating the main program procedure having the matching name;
    providing an entry point to the main program procedure in a writable memory location that contains the address of the main program procedure; and
    writing the address of the subprogram procedure into the memory location over the address of the main program procedure.

5. The method of claim 4 wherein providing an entry point comprises providing a jump table having a storage location whose contents can be modified to cause a jump to the subprogram procedure rather than the main program procedure.

6. A computer implemented method of dynamically linking a subprogram to a currently executing main program, comprising the computer implemented steps of:
    providing a subprogram procedure with a name matching the name of a min program procedure;
    translating the subprogram procedure to place the name of the subprogram procedure in a subprogram symbol table;
    comparing the subprogram procedure name in the subprogram symbol table with main program procedure names in a main program symbol table for locating the main program procedure having the matching name; and
    changing an instruction in the main program procedure having the matching name to a jump instruction to cause a jump to the subprogram procedure whenever the main program procedure is called.

7. The method of claim 6 including matching referenced identifiers in the subprogram symbol table with defined identifiers in the main program symbol table.

* * * * *